(12) United States Patent
Lee et al.

(10) Patent No.: US 6,778,207 B1
(45) Date of Patent: Aug. 17, 2004

(54) FAST DIGITAL PAN TILT ZOOM VIDEO

(75) Inventors: Mi-Suen Lee, Ossining, NY (US); Mircea Nicolescu, Los Angeles, CA (US); Gerard Medioni, Los Angeles, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 892 days.

(21) Appl. No.: 09/633,762

(22) Filed: Aug. 7, 2000

(51) Int. Cl.[7] .................................................. H04N 7/00
(52) U.S. Cl. ............................ 348/36; 348/37; 348/47; 348/48
(58) Field of Search ............................. 348/38, 48, 36, 348/37, 47

(56) References Cited

U.S. PATENT DOCUMENTS

| | | | |
|---|---|---|---|
| 5,444,478 A | | 8/1995 | Lelong et al. ................. 348/39 |
| 5,488,674 A | * | 1/1996 | Burt et al. .................... 382/284 |
| 5,657,073 A | | 8/1997 | Henley .......................... 348/38 |
| 5,703,961 A | * | 12/1997 | Rogina et al. ............... 382/154 |
| 5,850,352 A | * | 12/1998 | Moezzi et al. ............... 345/419 |
| 5,920,657 A | * | 7/1999 | Bender et al. ............... 382/284 |
| 6,064,399 A | * | 5/2000 | Teo ............................... 345/629 |
| 6,157,747 A | * | 12/2000 | Szeliski et al. .............. 382/284 |
| 6,389,179 B1 | * | 5/2002 | Katayama et al. ........... 382/284 |
| 6,393,163 B1 | * | 5/2002 | Burt et al. .................... 382/294 |
| 6,473,118 B1 | * | 10/2002 | Morrow ........................ 348/143 |
| 6,677,981 B1 | * | 1/2004 | Mancuso et al. .............. 348/36 |

FOREIGN PATENT DOCUMENTS

| | | | |
|---|---|---|---|
| WO | WO9847291 | 3/1998 | ............ H04N/7/18 |
| WO | WO9847291 | 10/1998 | ............ H04N/7/18 |

OTHER PUBLICATIONS

Makoto Masunaga, "Image Pickup Device"; 5–176212; Japan; Jul. 1993; (Abstract).

* cited by examiner

Primary Examiner—Chris Kelley
Assistant Examiner—Charles Parsons
(74) Attorney, Agent, or Firm—Edward W. Goodman

(57) ABSTRACT

A virtual PTZ camera is described which forms a virtual image using multiple cameras whose fields of view overlap. Images from the cameras are merged by transforming to a common surface and property-blending overlapping regions to smooth transitions due to differences in image formation of common portions of a scene. To achieve high speed, the images may be merged to a common planar surface or set of surfaces so that transforms can be linear. Image information alone may be used to calculate the transforms from common feature points located in the images so that there is no need for three-dimensional geometric information about the cameras.

14 Claims, 3 Drawing Sheets

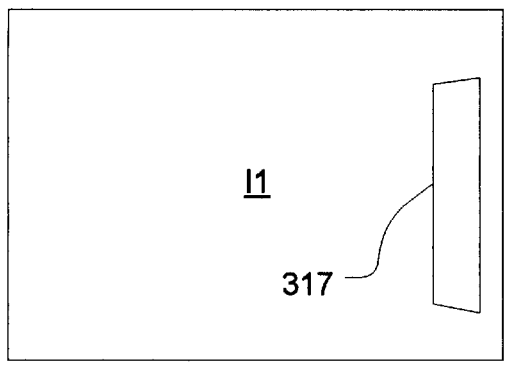
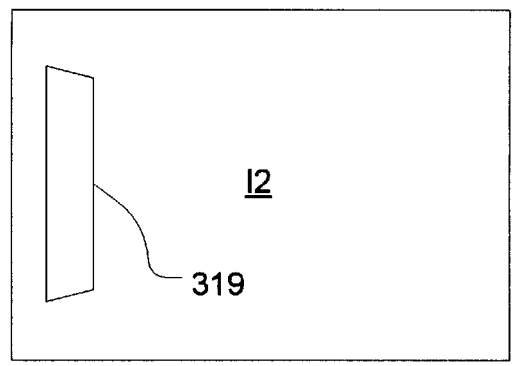
Fig. 7      Fig. 8
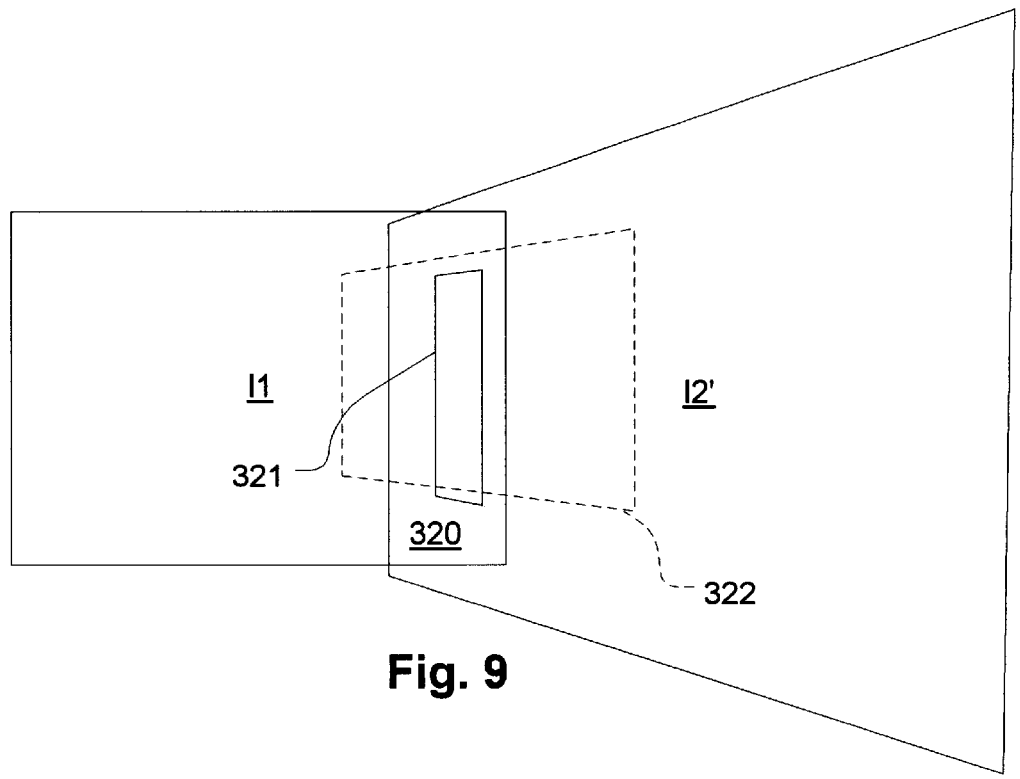
Fig. 9
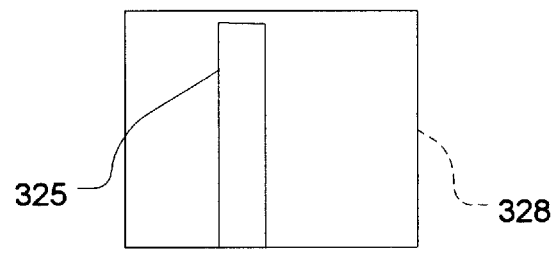
Fig. 10

FAST DIGITAL PAN TILT ZOOM VIDEO

BACKGROUND OF THE INVENTION

1. Field of the Invention

The invention relates to digital pan tilt zoom (PTZ) effects achieved by multiple cameras using digital image processing to interpolate and transform separate images into seamless selectable images otherwise acquired by mechanical PTZ setups and more specifically to such systems that employ planar transforms for high speed.

2. Background

The prior art offers a multitude of ways to combine images of a scene into a single wide-angle image. One system is Apple Corporation's Quick Time VR, which was adapted to create panoramas in a virtual reality world. The Apple system utilizes a camera to shoot a panorama based on multiple images taken as the camera is rotated around a point, the frames of the photos overlapping slightly. Software "stitches" the individual photos together to make a 360 degree view. The resulting panorama image is a cylindrical projection.

In addition, it is also known to transform images so that certain input pixels of an input image transform to a portion of an output image, as is shown in U.S. Pat. No. 5,067,019 to Juday, et al. The transformation may generate a zoom in and zoom out effect. U.S. Pat. No. 5,185,667 to Zimmermann describes a system providing perspective-corrected views of selected portions of a hemispherical view using. This device inputs an image from a fish eye lens and produces a circular image of an entire hemispherical field-view, which is mathematically corrected to remove distortion. U.S. Pat. No. 5,313,306 to Kuban et el. shows system that is capable of perspective and distortion correction of taken with a wide angle camera. It provides pan, tilt, and zoom, without mechanical movement. U.S. Pat. No. 5,359,363, also to Kuban et al., shows a system with perspective and distortion corrected views of a selected portion of a field of view. U.S. Pat. No. 5,657,073 describes a method of processing multiple streams of digital or analog video, each capturing a particular or unique field of view, and transforming these images into a single panoramic or panospheric output.

Although the prior art supplies motivation for some digital effects corresponding to element of a PTZ camera system, there remains a need for efficient systems for providing full PTZ functionality based on digital processing. Since processing time for image distortion correction and connection is a computationally intense enterprise, there is a great need for methodologies that ease this burden so as to allow high frame rates and low cost, such as for videoconferencing systems.

SUMMARY OF THE INVENTION

An array of video cameras produces images that are processed to form the functional-equivalent of a PTZ camera. An offline pre-calibration procedure is used to create a two-dimensional mosaic of the observed scene with geometric correction. Any arbitrary intermediate view is generated from the collection of images.

Briefly, an array of fixed digital cameras is mounted on an arrangement to provide piecewise coverage of a panorama or panosphere with overlapping visual fields. The overlap is used for calibration. A two dimension mosaic of the observed scene is geometrically and photometrically corrected using a equations or lookup tables that are derived offline based on a calibration procedure. The corrections are then applied to the combination of images and electronic panning, tilting, and zooming of a virtual camera (with pixel interpolation as required) are performed to acquire a selected field of view. The image corrections include lens distortion correction and linear transformation (warping) of images into a single mosaic and intensity blending at the overlapping regions. The necessary transforms for creating the mosaic are computed offline and the PTZ operations are performed in real time. These steps are described in more detail below.

The input frames are continuously captured by the camera array. Stereo effects are avoided by insuring that the objects imaged are not very close to the cameras. The separate frames are registered and warped to a common planar mosaic as a panoramic environment map. A portion of the mosaic is then selected using a PTZ control input to a processor and warped into a virtual camera view.

Lens distortion may be corrected by any suitable means. In the preferred embodiment of the invention, wide angle cameras are used which create more lens distortion than long focal length lens systems. Such cameras are desirable because a smaller number of cameras may be used for a given total field of view. It is necessary to correct the distortion introduced by each lens before attempting to register the images as will become clear.

Lens distortion of a point in an image can be decomposed into three components: shift of the image center, radial distortion (also called barrel distortion), and decentering distortion. Radial distortion is the most disturbing one for purposes of frame registration. The others can be ignored for, assuming that the image center is close to the lens center and that lens components are orthogonal to the optical axis.

Lens distortion may be compensated for by various image processing techniques. It has been learned that first order geometric radial correction will provide good results and this is discussed below. However, it should be understood that many techniques may be employed within the compass of the invention and the following discussion is not intended to be limiting in this regard.

Radial distortion in most wide-angle cameras pulls image points toward the optical center. This effect is axially symmetric and depends only on the distance from the optical center through a distortion parameter $\gamma$. The distortion component may be expressed as:

$$\Delta r = \sum_{i=1}^{\infty} \gamma_{2i+1} r^{2i+1}$$

Terms higher than third order can be ignored as their contributions to the distortion are negligible in practice, so the above can be simplified to:

$$\Delta r = \gamma_3 r^3$$

$$x = x_d + \gamma(x_d - x_c) r^2$$

$$y = y_d + \gamma(y_d - y_c) r^2$$

where $(x_c, y_c)$ is the image center, $(x_d, y_d)$ the observed (distorted) point and $r^2 = (x_d - x_c)^2 + (y_d - y_c)^2$ and $(x, y)$ is the undistorted point. The above equation models only the cubic term of radial lens distortion, the most significant in practice. For simplicity, it is also assumed that each video frame is distorted with the same lens distortion parameter $\gamma$ and that both x and y are identically affected by lens distortion. Since this operation involves interpolation of pixel intensities (and/or hues) to undistort the image, its impact on processing time is significant.

To generate any intermediate arbitrary view, images acquired by the cameras must be registered and merged into a panoramic, spherical, or panospheric map of the composite viewing field. This map is a projection of the scene onto a shape, preferably a simple shape. For a region of interest that completely surrounds the camera system, this shape could be a cube, or a sphere. Reprojecting portions of an environment map to create a novel view is dependent on the type of environment map. For a cubic one, the reprojection is linear, requiring merely the display of the visible regions of six texture mapped squares in the view plane. For a spherical map, non-linear warping must be done. For panoramas or smaller fields of view, cylindrical, hemispherical, or planar environment maps can be used. For a large field with less than 180 degrees of panning, a planar map is preferable when processing time is a significant design issue. Also, it has the advantage of permitting efficient warping by specialized software, such as the Intel® Processing Library (IPL).

The planar map is an imaginary projection of the scene on a plane located an arbitrary distance from the cameras. Each lens-distortion-corrected image frame is warped (planar projection transform) onto this plane. The transform can be computed offline for each frame so that the only operation performed in real time is the actual warping. Pixel interpolation is responsible for the major computational burden.

The transform can be derived in two ways: with predefined geometric information on the camera orientations and image-forming properties or, preferably, using predefined registration points in the images themselves. The registration points should be at least four in number and visible in each pair of frames to be registered. The process is described in copending U.S. patent application Ser. No. 09/572,991 filed May 17, 2000 for APPARATUS AND METHOD FOR INDICATING A TARGET BY IMAGE PROCESSING WITHOUT THREE-DIMENSIONAL MODELING, the entirety of which is hereby incorporated by reference as if fully set forth herein.

To generate a final image, the panoramic or panoshpheric map must be warped to the frame acquired using the PTZ control signals. For this purpose, the appropriate portion of a frame, selected by the PTZ controller, is warped to a plane normal to the view axis of the virtual camera defined by the PTZ control signals. In other words, the approach is to recover the perspective transform that maps the view's rectangle into the corresponding quadrangle in the mosaic. This is precisely the same type of transformation used to generate the planar mosaic. Note that zoom is obtained by interpolation using standard techniques so that a low resolution image can be mapped to a high resolution signal as the virtual camera is zoomed in. Preferably, the zooming technique employs anti-aliasing to minimize artifact from interpolation.

To match up the frames, overlapping regions may be intensity and/or color blended pixel by pixel. This is made possible by the fact that the warping of the overlapping regions to a common map causes the pixels corresponding to a particular scene portion substantially to coincide. Thus, the hue and intensitys of each pixel from an overlapping region can be blended or averaged, borrowing scene information from each image. The averaging may be pixel by pixel or, alternatively, an averaging kernel larger than a pixel may be used to accommodate imperfect registration between images. Various techniques are possible, but a graded blend where the weighting of the hue and/or intensity contributing to the average are biased in proportion to the distance of the pixel to the corresponding image center. The result is a smoothing effect. Before applying the smoothing effect, however, a global adjustment (for the entire frame) of hue and alpha data may be done before blending to compensate for global differences in the cameras, lighting differences in the respective fields of view, etc.

The blending operation weights the influence of one frame's domains (again, a domain can be a pixel or a larger unit) by how far the transition is from the centerline of the overlap (i.e., or the distance of each pixel from its image's boundary). The closer a domain is to the image boundary, the lower its contribution to the properties of the overlapping region. If k frames overlap, the properties of the resulting domains are computed based on properties P and distances d as:

$$P = \frac{\sum_{k=0}^{N} d_k \cdot P_k}{\sum_{k=0}^{N} d_k}$$

This method has the advantage of dealing with local intensity differences, which the most conspicuous to a human observer. It is also general in that it works without any assumptions about the shape of the overlapping area.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWING

FIGS. 7 and 8 are respective images of cameras having overlapping fields of view for discussing the warping of images into a single mosaic.

FIG. 9 is an illustration of a portion of the mosaic of FIGS. 7 and 8.

FIG. 10 is an illustration of an image of a virtual camera selected from the mosaic of FIG. 9.

DETAILED DESCRIPTION OF THE PREFERRED EMBODIMENTS

Figure 1:
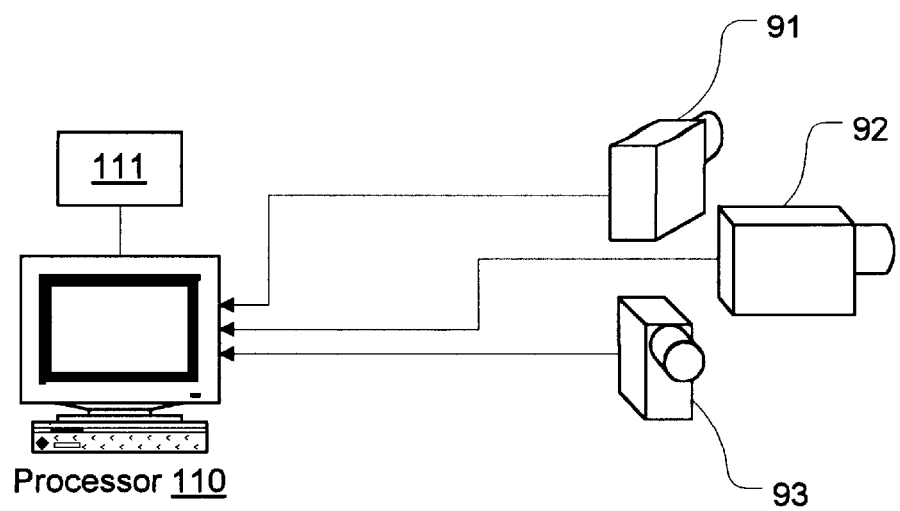
FIG. 1 is an illustration of a computer and camera setup that can be used to implement an embodiment of the invention.
Figure 2:
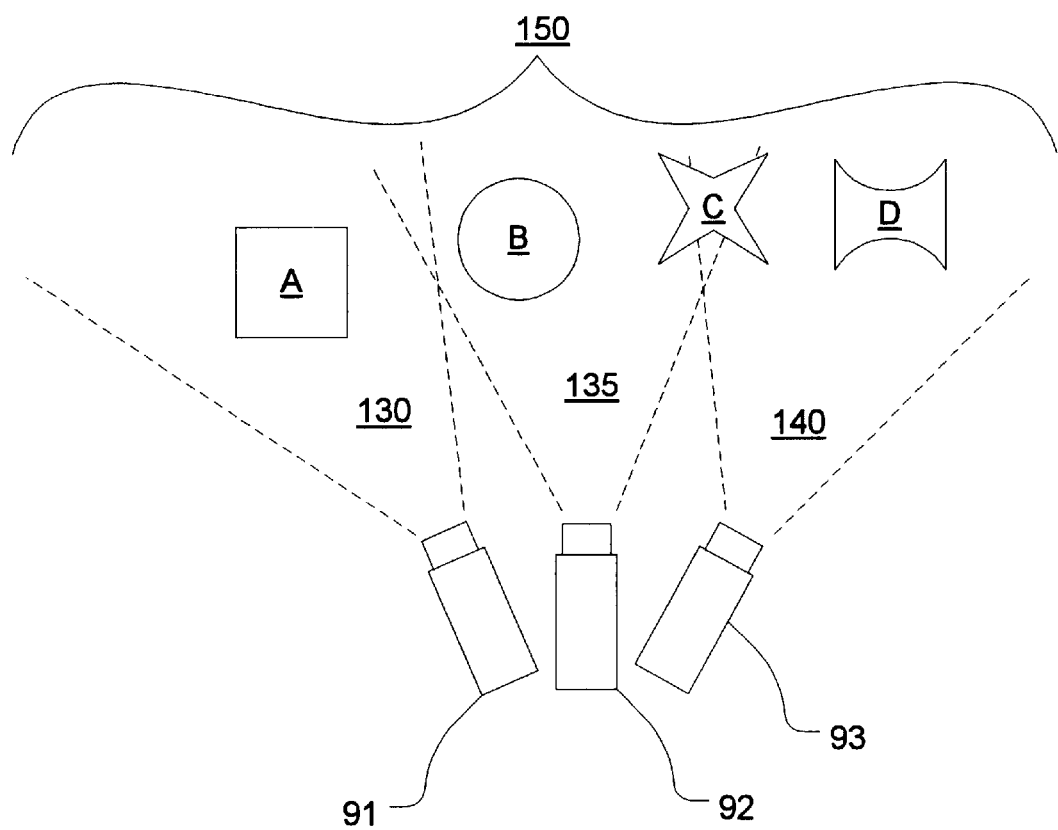
FIG. 2 is an overhead illustration of a three-camera setup showing fields of view of the cameras and their overlap.

Referring to FIG. 1, a processor 110, here represented by a stand-alone computer is connected to three cameras 91, 92, and 93 arranged so that their respective fields of view overlap. The diagram is illustrative only and any number of cameras may be used. Referring to FIG. 2, the overlap in the respective fields of view 130, 135, and 140 of the three cameras 91, 92, and 93 provides coverage of a composite field of view 150. Various objects may fall within the fields of view such as A, B, C, and D. The invention permits each object to be captured and zoomed in on using a virtual camera. Thus, object C, which is only partly visible in the fields of view of cameras 92 and 93, can be seen in its entirety as if a single camera were trained directly on it.

Figure 3:
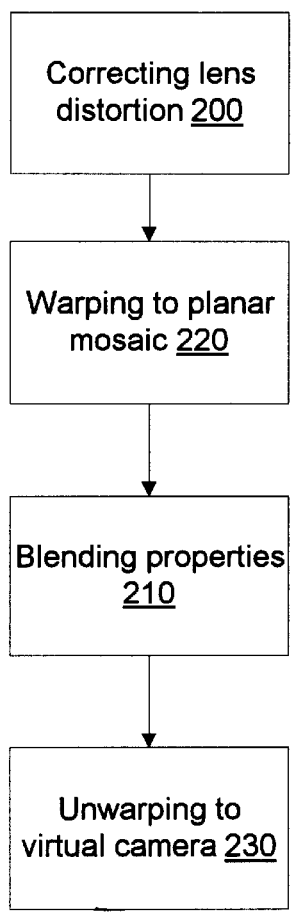
FIG. 3 is a flow diagram of an overall process for producing a virtual camera image from the images of separate cameras according to the invention.

Referring now to FIG. 3, according to a preferred embodiment, images formed by each camera are subjected to filtering as follows for form a new virtual camera image (not shown). First, the lens distortion of each image is corrected 200. Next, the images are analyzed for feature points to permit them to be warped into a common surface. This surface can be a spherical surface, a set of planes, or any other surface. Preferably the images may be mapped to a single plane, because the processing can be rapid. In an embodiment that provides a total coverage of substantially less than 180 degrees, a single plane is suitable. In an embodiment with a field of view that is central to such an array, for example camera 92, the image planes of the other cameras can be warped to the image of the central one. This avoids the need to map the points on one of the images. In addition to warping, the images are registered by translation so that the same feature points coincide in the respective images in their overlapping regions.

Next, the pixel properties of overlapping image regions are blended 220. For example, the image intensity, contrast, hue, etc. can be modified so that there are no resulting contours characterized by abrupt transitions in color or intensity. Finally, in step 230, a region of the composite image is selected using a PTZ control signal and the selected region warped to a plane corresponding to the field of view of a virtual camera.

Figure 4:
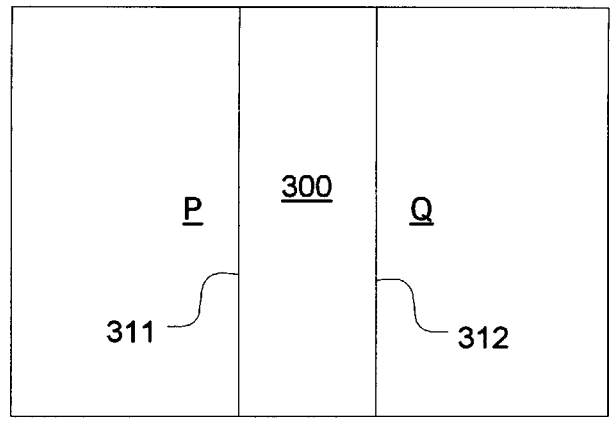
FIG. 4 is an illustration of adjacent overlapping images for purposes of discussing an image property blending technique.

Referring to FIG. 4, two overlapping regions P and Q overlap in a region 300. It is understood that in FIG. 4 the regions P and Q have already been warped to a common surface so that features in each image coincide. Thus, although the regions are represented as rectangles, it is to be understood that this shape is only figurative and that these regions represent arbitrary overlapping image regions and not unmerged frames. The blending of properties (e.g., R, G, B, and/or intensitys) may be achieved by weighted-averaging the properties of overlapping regions in the merged images. To accomplish averaging, the regions that are averaged must represent the same portion of the scene. Because the images are merged by warping to a common surface, in principle the portions will coincide perfectly as this is the goal of warping. In practice there may be some error so that each coincident pair of pixels may not represent precisely the same portion of the scene. To hedge against this problem, each overlapping region of the scene is broken down into domains that are large enough that the degree of misregistration that may exist (and this varies on an application by application basis as would be clear to a person of ordinary skill) contributes only marginally to the property differences in each domain. Any or all of the pixel properties may be weight-averaged within the domain. If only one property is to be matched, probably the most important is intensity.

Figure 5:
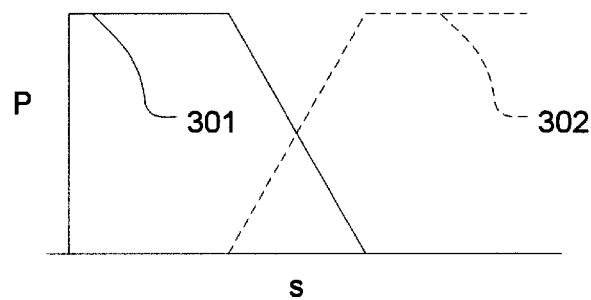
FIG. 5 is an illustration of weighting profiles for use in property blending according to one preferred alternative embodiment.
Figure 6:
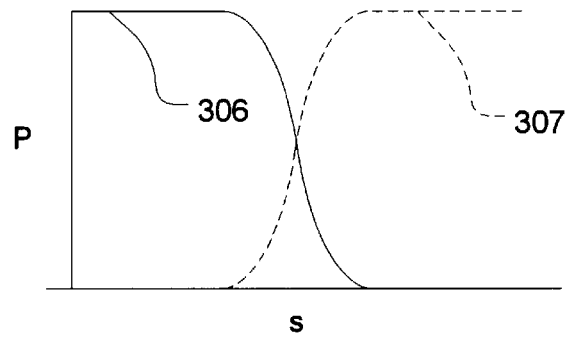
FIG. 6 is an illustration of weighting profiles for use in property blending according to another preferred alternative embodiment.

Referring now also to FIG. 5, the weight of the averaging of the various components is proportional to the distance from the boundary of the image of which the domain is a part once the boundary of an adjacent image is crossed. Thus, the weight 301 of image P is 1.0 within the image region until the boundary 311 of image Q is crossed whereupon it falls linearly until it is zero at the boundary 312 of image P. The same treatment is used to derive the weight 302 for the properties of image Q. Note that although the discussion here presumes a linear weighting, preferably the weighting takes into account the gain inherent in the perception, particularly if the differences are significant. Thus, ideally the weighting is modified to reflect the inherent gain in visual perception (which causes a doubling of intensity to appear as less than a doubling of brightness). For small differences, this adjustment will not be necessary and in the interest of high speed, can be ignored, although a lookup table approach may be used to speed the computation. Referring to FIG. 5, the profiles need not be perfectly linear and various weighting profiles may be used.

Referring to FIGS. 7 and 8, two images I1 and I2 from respective cameras are to be merged. Image I1 corresponds to a central camera and to save processing time, the common planar mosaic will be formed on the plane of image I1. A set of at least four feature points corresponding to the same object is identified in each image using correlation techniques which may be based on area counts or joins for Voronoy diagrams or Delaunay triangulation based on the feature point sets. Preferably, two-dimensional correlation of a Guassian kernel around candidate pairs of feature points will provide a fast and accurate test. In FIGS. 7 and 8, four points are represented by an object 317 as viewed in image I1 and the same object 319 as viewed in image I2. The four points are represented as the corners of the respective object images 317, 319. The four points are preferably on the same plane, but if they are sufficiently distant from the cameras, they do not have to lie precisely on the same plane. These points, and the object associated with the image 317, may be a temporary setup device to register the cameras before use because once the registration process is completed, it does not have to be performed again until the cameras are moved.

The planar projection transform may be computed based on the image feature points at one time during a setup process. In other words, the image warping calculations to determine the transform need only be done offline (only once) and thereafter, the same transform applied repeatedly. Once the transform is stored, image I2 can be warped to form the planar mosaic shown in FIG. 9.

In the overlapping region, as a result of the application of the transform to Image I2 to yield image region I2', the four registration points of the object images 317 and 319 coincide at 321 in the overlapping region 320.

Once the planar mosaic is formed, a PTZ control signal may be used to select a view region 322 of a virtual camera. An angle corresponding to the direction (azimuth and declination) defined by the PTZ signal is used to compute a new plane two which the planar mosaic image can be warped to produce a virtual camera view as shown in FIG. 10. In FIG. 10, the image of the object 321 has been warped again to a result 325 in a new frame 328.

Although in the above example, we propose employing a planar mosaic, it is understood that the common surface to which images can be warped may be any surface. Also, the common surface does not have to have a continuous second derivative (smooth), but can be piecewise smooth such as for a cube representing a six-surface mosaic for 360 degree solid angle field of view. Projection to flat surfaces may be achieved through linear transforms so a planar common surface is preferred where computational burden is a factor in design.

Radial distortion expressed as:

$$\Delta r = \sum_{i=1}^{\infty} \gamma_{2i+1} r^{2i+1}$$

Which may be simplified assuming terms higher than third order can be ignored simplified to:

$$\Delta r = \gamma_3 r^3$$
$$x = x_d + \gamma(x_d - x_c) r^2$$
$$y = y_d + \gamma(y_d - y_c) r^2$$

where $(x_c, y_c)$ is the image center, $(x_d, y_d)$ the observed (distorted) point and $r^2 = (x_d - x_c)^2 + (y_d - y_c)^2$ and $(x, y)$ is the undistorted point. The above equation models only the cubic term of radial lens distortion, the most significant in practice. For simplicity, it is also assumed that each video frame is distorted with the same lens distortion parameter $\gamma$ and that both x and y are identically affected by lens distortion. Since this operation involves interpolation of pixel intensities to undistort the image, its impact on processing time is significant.

If k frames overlap, the properties of the resulting domains may be computed based on properties P and distances d as:

$$P = \frac{\sum_{k=0}^{N} d_k \cdot P_k}{\sum_{k=0}^{N} d_k}$$

This method has the advantage of dealing with local differences, which the most conspicuous to a human observer. It is also general in that it works without any assumptions about the shape of the overlapping area.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Although in the embodiments above two or three cameras are discussed to explain the invention, the number of cameras can be any number of cameras. In this vein, the recitation in the claims of first and second cameras does not preclude third, fourth, fifth and more cameras falling within the scope of the claims.

What is claimed is:

1. A method for generating an image from an arbitrary direction and with an arbitrary zoom from a scene by combining the images of first and second cameras, said method comprising the steps of:
    computing a transform that maps corresponding pairs of image subregions lying in overlapping portions of first and second images derivable from said first and second cameras, respectively, to a substantially identical subregion of a composite image;
    acquiring a first image from said first camera and a second image from said second camera;
    transforming and merging at least one of said first and second images to form composite image combining data from said first and second images;
    spatially blending at least one of intensity and color properties of said images to reduce abrupt transitions due to differences in said properties in said first and second images; and
    forming an image from a selected portion of said composite image,
    wherein said image forming step comprises:
        linearly transforming the selected portion of said composite image to a new plane coinciding with neither a plane of said first image and a plane of said second image.

2. The method as claimed in claim 1, wherein said transform is linear.

3. The method as claimed in claim 1, wherein said transform is a planar projection transform and said composite image is defined with respect to a plane.

4. The method as claimed in claim 1, wherein said step of computing comprises:
    identifying feature points in said first and second images and computing said transform responsively to said feature points such that information about orientations of said cameras is not required to compute said transform.

5. The method as claimed in claim 1, wherein said step of blending includes a weighted average, where a weight is computed responsively to a distance from a boundary line separating said first and second images.

6. The method as claimed in claim 1, wherein said step of blending includes a weighted average, where a weight is proportional to a distance from a boundary line separating said first and second images.

7. The method as claimed in claim 1, wherein said step of forming further comprises:
    interpolating property values of pixels to generate a zoom effect.

8. A device for generating an image from an arbitrary direction and with an arbitrary zoom from a scene by combining the images of first and second cameras, comprising:
    an image processor connectable to receive image data from two cameras;
    said image processor having a memory;
    said image processor being programmed to compute a transform that maps corresponding pairs of image subregions lying in overlapping portions of first and second images derivable from said first and second cameras, respectively, to a substantially identical subregion of a composite image and storing a definition of said transform in said memory;
    said image processor being further programmed to receive first and second images from said first and second cameras, respectively, and transform and merge at least one of said first and second images to form composite image combining data from said first and second images;

said image processor being further programmed to spatially blend at least one of intensity and color properties of said images to reduce abrupt transitions due to differences in said properties in said first and second images; and said image processor being still further programmed to generate a selected image from a selected portion of said composite images, wherein said image processor is programmed such that said selected image is generated from said composite image by transforming a portion of said composite image to a new plane coinciding with neither a plane of said first image and a plane of said second image.

9. The device as claimed in claim 8, wherein said transform is linear.

10. The device as claimed in claim 8, wherein said transform is a planar projection transform and said composite image is defined with respect to a plane.

11. The device as claimed in claim 8, wherein said transform is computed by first identifying feature points in said first and second images and computing said transform responsively to said feature points such that information about orientations of said cameras is not required to compute said transform.

12. The device as claimed in claim 8, wherein said step of blending includes a weighted average, where a weight is computed responsively to a distance from a boundary line separating said first and second images.

13. The device as claimed in claim 8, wherein said image processor is programmed to spatially blend by weighted averaging, where a weight of said weighted averaging is proportional to a distance from a boundary line separating said first and second images.

14. The device as claimed in claim 8, wherein said selected image is generated, in part, by interpolating property values of pixels to generate a zoom effect.

* * * * *